(12) United States Patent
Dooner

(10) Patent No.: US 9,707,437 B2
(45) Date of Patent: Jul. 18, 2017

(54) REAR HANDLEBAR ASSEMBLY FOR A STATIONARY BIKE

(71) Applicant: Michael Joseph Dooner, Kunkletown, PA (US)

(72) Inventor: Michael Joseph Dooner, Kunkletown, PA (US)

(*) Notice: Subject to any disclaimer, the term of this patent is extended or adjusted under 35 U.S.C. 154(b) by 42 days.

(21) Appl. No.: 15/086,917

(22) Filed: Mar. 31, 2016

(65) Prior Publication Data

US 2017/0106229 A1    Apr. 20, 2017

Related U.S. Application Data

(60) Provisional application No. 62/242,695, filed on Oct. 16, 2015.

(51) Int. Cl.
  *A63B 22/06* (2006.01)
  *A63B 21/00* (2006.01)
  *A63B 23/16* (2006.01)

(52) U.S. Cl.
  CPC ...... *A63B 21/4035* (2015.10); *A63B 22/0605* (2013.01); *A63B 23/16* (2013.01)

(58) Field of Classification Search
  CPC .... B62K 15/00; B62K 15/006; B62K 15/008; B62K 2015/001; A63B 22/0605; A63B 21/225; A63B 2225/093; A63B 21/015; A63B 2225/09; A63B 22/001; A63B 22/0023; A63B 22/0046; A63B 69/16; A63B 2022/0641; A63B 21/00058; A63B 21/4049; A63B 2208/0233;

(Continued)

(56) References Cited

U.S. PATENT DOCUMENTS 633,746 A * 9/1899 Anderson ............... B62K 5/05
                                                    280/266
823,161 A    6/1906 Rome
(Continued)

FOREIGN PATENT DOCUMENTS

CH           84547        3/1920
GB          479945        2/1938
(Continued)

OTHER PUBLICATIONS

International Search Report mailed Jul. 15, 2016, issued in PCT Patent Application No. PCT/US2016/025210.
(Continued)

*Primary Examiner* — Andrew S Lo

(57) ABSTRACT

A joining member is positioned between the seat and the body in a stationary bike with a seat aligned with the front of the bike body. An extending member projects upwardly from the joining member at an angle that is less than about 30 degrees in relation to the joining member and rearwardly with at least a portion of the extending member being positioned behind the seat rear portion; and a crossbar projects from the extending member essentially perpendicularly to joining member to form a handlebar for providing support for the arms of a rider when the arms are positioned behind the body of the rider. The seat is connected to the body upper surface with an essentially vertical supporting member. The joining member includes a bore for receiving the supporting member.

6 Claims, 15 Drawing Sheets

(58) Field of Classification Search
CPC .... A63B 2022/0623; A63B 2022/0652; A63B 2022/0658; A63B 2022/067; A63B 2069/164; A63B 2069/165; A63B 21/00076; A63B 21/00178; A63B 21/0051; A63B 21/4047
USPC ............... 482/51, 57–66; 280/200, 259, 278
See application file for complete search history.

(56) References Cited

U.S. PATENT DOCUMENTS

| | | | |
|---|---|---|---|
| 2,341,821 A | 2/1944 | Schwinn | |
| 3,132,872 A | 5/1964 | Pinsly | |
| 3,365,997 A | 1/1968 | Price | |
| 4,641,882 A * | 2/1987 | Young | A47C 9/025 297/183.1 |
| 5,823,915 A | 10/1998 | Chen | |
| 5,904,638 A * | 5/1999 | Habing | A63B 22/0605 482/57 |
| 8,523,212 B2 * | 9/2013 | Ryan | B62K 15/008 180/206.1 |
| 2001/0031686 A1 * | 10/2001 | Ware | A63B 21/015 482/57 |
| 2002/0096858 A1 | 7/2002 | Shaw | |
| 2005/0029772 A1 * | 2/2005 | Oi | B62J 6/18 280/281.1 |
| 2005/0199090 A1 | 9/2005 | Renshaw | |
| 2009/0227429 A1 * | 9/2009 | Baudhuin | A63B 71/0622 482/57 |
| 2010/0041523 A1 * | 2/2010 | Bingham, Jr. | A63B 21/225 482/65 |
| 2011/0105282 A1 * | 5/2011 | Pinzon | A63B 22/0605 482/57 |
| 2011/0237403 A1 * | 9/2011 | Huber | A63B 22/0605 482/57 |
| 2012/0088638 A1 * | 4/2012 | Lull | A63B 21/015 482/57 |
| 2012/0280468 A1 * | 11/2012 | Garcia | B62J 6/02 280/274 |
| 2012/0295770 A1 * | 11/2012 | Lo | A63B 22/0046 482/57 |
| 2012/0329611 A1 * | 12/2012 | Bouchard | A61H 1/0214 482/57 |
| 2015/0225033 A1 * | 8/2015 | Yap | B62K 15/006 280/259 |
| 2016/0144927 A1 * | 5/2016 | Bayne | B62M 1/16 280/240 |

FOREIGN PATENT DOCUMENTS

| | | |
|---|---|---|
| WO | 2006116227 A1 | 11/2006 |
| WO | 2011016680 A2 | 2/2011 |
| WO | 2011016680 A3 | 7/2011 |

OTHER PUBLICATIONS

Machine-generated translation of the specification for CH84547.
Machine-generated translation of the claims for CH84547.
English-language abstract for 2011016680A2 and 2011016680A3.
Easton's 35millimeter Handlebar Standard for DH: 800mm Havoc Handlebar and Matching Stem Pinkbike http://www.pinkbike.com/news/Eastons35millimeterHandlebarStandardforDH800mm Havoc2012.html Apr. 19, 2012.
Havoc 35 Stems Product Literature (Undated).

* cited by examiner

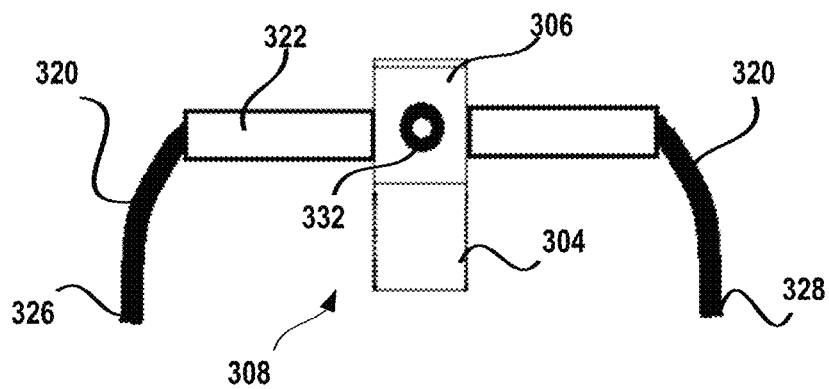
FIG. 3D
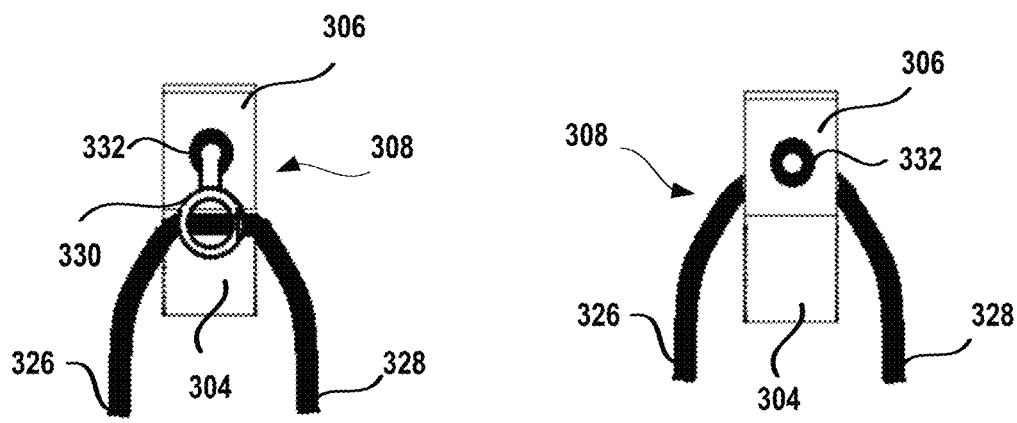
FIG. 3E  FIG. 3F

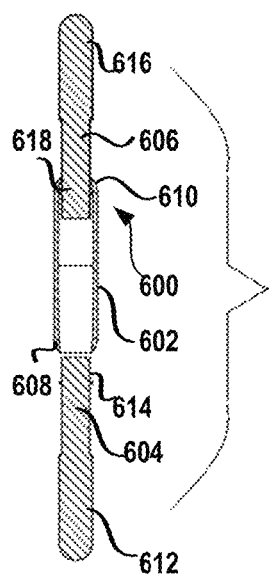
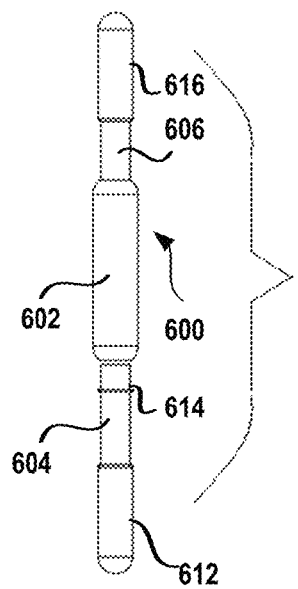
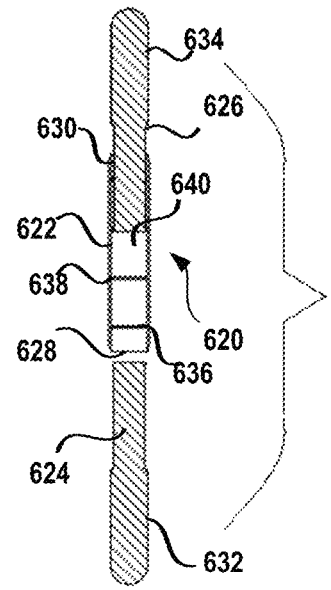
FIG. 6A     FIG. 6C     FIG. 6E
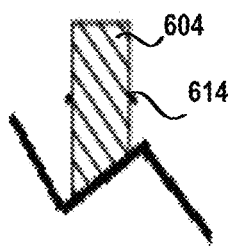
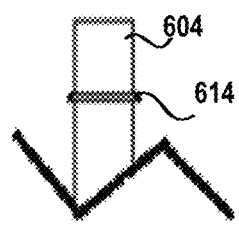
FIG. 6B     FIG. 6D

REAR HANDLEBAR ASSEMBLY FOR A STATIONARY BIKE

CROSS REFERENCE TO RELATED APPLICATION

This application claims the benefit under 35 U.S.C. §119 (e) of U.S. Provisional Application No. 62/242,695 entitled "REAR MOUNTED HANDLE BAR" filed Oct. 16, 2015, which is incorporated herein by reference.

BACKGROUND

Upright exercise bikes are a staple of cardiovascular exercise because they provide a full-body workout that exercises the legs, the abdomen, the buttocks, the hips, the upper body, the lungs, and the heart. A rider, typically, rides an upright exercise bike in a forward-leaning, crouching position that simulates outdoor racing. However, riders often find themselves in an upright and vertical position the normal course of riding a stationary exercise bike for a variety of reasons.

The upright vertical position provides various benefits from a physiological and ergonomic standpoint when it is maintained for more than short intervals of time. Unfortunately, it can be difficult to maintain this position. As a result, this limits the benefits that can be realized by maintaining an upright riding position while riding stationary exercise bikes.

SUMMARY

The following summary is provided to introduce a selection of concepts in a simplified form that are further described below in the detailed description. This summary is not intended to identify key features or essential features of the claimed subject matter, nor is it intended to be used to limit the scope of the claimed subject matter.

In various implementations, a handlebar assembly for a stationary bike having a body, a supporting member, and a seat with an upper surface, a front portion, and rear portion, the handlebar assembly includes a joining member positioned between the seat and the body with the seat aligned with the front of the body so that a rider overlooks the seat front portion when positioned on the seat. An extending member projects upwardly from the joining member at an angle that is less than about 30 degrees in relation to the joining member and rearwardly with at least a portion of the extending member being positioned behind the seat rear portion. A crossbar projects from the extending member essentially perpendicularly to joining member to form a handlebar for providing support for the arms of the rider when the arms are positioned behind the body of the rider. The seat is connected to the body upper surface with an essentially vertical supporting member so that the supporting member supports the seat in a spaced-apart overhead relationship with the body. The joining member includes a bore therethrough for receiving the supporting member to connect the handlebar assembly to the stationary bike.

These and other features and advantages will be apparent from a reading of the following detailed description and a review of the appended drawings. It is to be understood that the foregoing summary, the following detailed description and the appended drawings are explanatory only and are not restrictive of various aspects as claimed.

BRIEF DESCRIPTION OF THE DRAWINGS

FIG. 3D illustrates an end view of the preferred embodiment shown of the rear handlebar assembly in FIG. 3A with an additional exercise device that can implement aspects of the described subject matter.

FIG. 3E illustrates an end view of the preferred embodiment shown of the rear handlebar assembly in FIG. 3A with another embodiment of an additional exercise device that can implement aspects of the described subject matter.

FIG. 3F illustrates an end view of the preferred embodiment shown of the rear handlebar assembly in FIG. 3A with another embodiment of an additional exercise device that can implement aspects of the described subject matter.

FIG. 6A is a sectional view in side elevation of a crossbar that can implement aspects of the described subject matter.

FIG. 6B is a fragmentary sectional view in side elevation of the crossbar shown in FIG. 6A that can implement aspects of the described subject matter.

FIG. 6C is a side elevation view of the crossbar shown in FIG. 6A that can implement aspects of the described subject matter.

FIG. 6D is a fragmentary side elevation view of the crossbar shown in FIG. 6A that can implement aspects of the described subject matter.

FIG. 6E is a sectional view in side elevation of another embodiment of a crossbar that can implement aspects of the described subject matter.

DETAILED DESCRIPTION

Figure 1A:
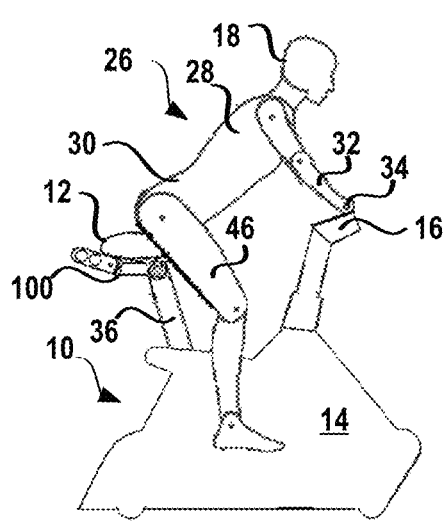
FIG. 1A illustrates a side elevation view of a stationary bike and a stationary bike rider in a traditional outdoor riding position that can implement aspects of the described subject matter.

The detailed description provided below in connection with the appended drawings is intended as a description of examples and is not intended to represent the only forms in which the present examples can be constructed or utilized. The description sets forth functions of the examples and sequences of steps for constructing and operating the examples. However, the same or equivalent functions and sequences can be accomplished by different examples.

References to "one embodiment," "an embodiment" "an example embodiment." "one implementation," "an implementation." "one example," "an example" and the like, indicate that the described embodiment, implementation or example can include a particular feature, structure or characteristic, but every embodiment, implementation or example can not necessarily include the particular feature, structure or characteristic. Moreover, such phrases are not necessarily referring to the same embodiment, implementation or example. Further, when a particular feature, structure or characteristic is described in connection with an embodiment, implementation or example, it is to be appreciated that such feature, structure or characteristic can be implemented in connection with other embodiments, implementations or examples whether or not explicitly described.

Numerous specific details are set forth in order to provide a thorough understanding of one or more aspects of the described subject matter. It is to be appreciated, however, that such aspects can be practiced without these specific details.

Various aspects of the subject disclosure are now described in more detail with reference to the drawings, wherein like numerals generally refer to like or corresponding elements throughout. The drawings and detailed description are not intended to limit the claimed subject matter to the particular form described. Rather, the intention is to cover all modifications, equivalents and alternatives falling within the spirit and scope of the claimed subject matter.

The physiological benefits of riding upright stationary exercise bikes in an upright vertical position are known to those in the exercise industry. However, many riders find it difficult to maintain the upright riding position for an extended period of time because traditional stationary exercise bikes do not have sufficient arm support in that exercise position. In fact, traditional bikes have front handlebars that move farther away from a rider when the rider adjusts handlebars, which creates more space between the rider and the front handlebars.

Riders will often compensate for these shortcomings by leaning forward, which becomes more awkward over extended riding periods. The rider can be subject to additional stress to the neck and back area in this position because the rider must extend his or her arms and upper torso in a forward leaning position. The rider must push off of the front handlebars to provide enough momentum to move the upper torso back to the vertical position when the rider wants to return to a seated, vertical position.

Due to the above-described disadvantages and limitations associated with traditional stationary bikes, an improved bike has been developed. This improved bike includes a rear handlebar assembly that allows riders to maintain an upright riding position for longer durations. This improved bike allows a rider to remain safely in contact with the rear handlebar assembly while riding in a vertical upright position and allows riders to shift to an extended, forward-learning position. As a result, riders can substitute an awkward lean-forward position with a safe, more spine-neutral vertical position while grasping the hand grips of the rear handlebar assembly.

Referring to the drawings and, particularly, to FIGS. 1A-1D, there is shown an upright stationary bike or indoor cycle generally designated by the numeral 10 that is particularly adapted for indoor exercise. The stationary bike 10 includes a seat 12, a body 14, a front handlebar assembly 16, and a rear handlebar assembly 100. The seat 12 includes a front portion 20, a rear portion 22, and an upper surface 24. The bike 10 is particularly suitable for spinning classes and other similar classes. However, the bike 10 can be used in any indoor cycling class or similar exercise class.

Figure 1B:
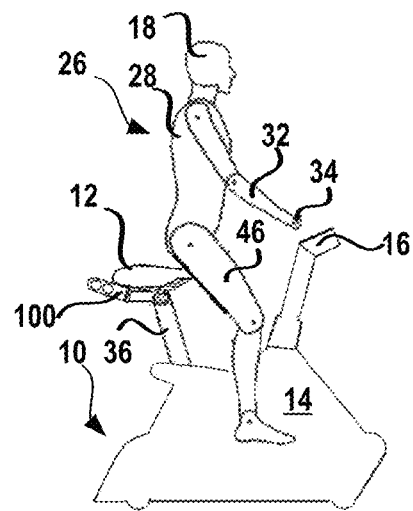
FIG. 1B illustrates a side elevation view of a stationary bike and a stationary bike rider in an upright riding position that can implement aspects of the described subject matter.
Figure 1C:
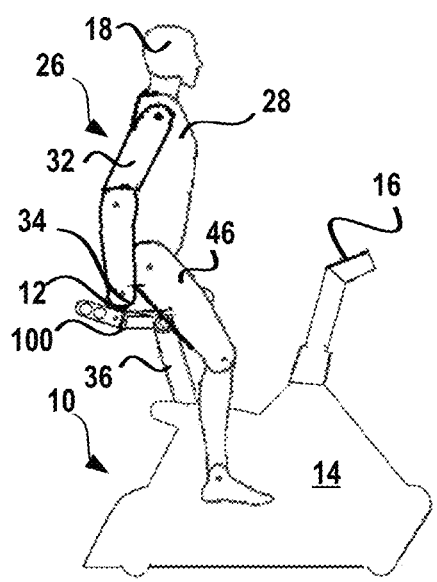
FIG. 1C illustrates a side elevation view of a stationary bike and a stationary bike rider in an upright riding position with hands supported by a rear handlebar that can implement aspects of the described subject matter.

As shown in FIGS. 1A-1C, the rider 26 can sit on the seat upper surface 24 with his or her head 18 facing the front portion 20) in various riding positions. Specifically, the rider 26 is shown in a traditional crouched riding position in FIG. 1A and in upright riding positions in FIGS. 1B-1C. The rider 26 is utilizing the rear handlebar assembly 100 in FIG. 1C.

Referring to FIG. 1A, the rider 26 can ride the bike 10 in a conventional riding position that simulates outdoor riding or racing. In this conventional riding position, the torso 28 of the rider 26 bends at the waist 30 at an angle. The rider 26 can extend his or her arms 32 to place his or her hands 34 upon the front handlebar assembly 16. However, the rider 26 does not receive certain exercise-related benefits that are associated with riding in an upright position.

Referring to FIG. 1B with continuing reference to the foregoing figure, the rider 26 can ride the bike 10 in the upright vertical position. The torso 28 of the rider 26 is essentially perpendicular to the ground. However, the arms 32 of the rider 26 do not have sufficient length to allow the rider 26 to place his or her hands 34 on the front handlebar assembly 16. More importantly, the rider 26 can experience excessive discomfort or fatigue when riding in this position for an extended period of time, due to the inability of the rider 26 to place the hands 34 on the front handlebar assembly 16.

Referring to FIG. 1C with continuing reference to the foregoing figures, the rider 26 can overcome the disadvantages associated with the riding positions that are shown in FIGS. 1A-1B. In FIG. 1C, the rider 26 places his or her hands 34 on the rear handlebar assembly 100 to rest for brief periods of time or for extended periods of time. The rider 26 can grip the handlebar assembly 100 from a natural arm position while being seated on the seat 12.

The rider 26 can use the rear handlebar assembly 100 to avoid discomfort and/or fatigue, while receiving the benefits of riding in an upright position. The rider 26 can also ride in comfort more frequently and for longer periods of time in an upright position, which can reduce neck strain and/or back strain throughout the entire ride.

The rear handlebar assembly 100 has no other effect on bike seat adjustments, can be removed in between rides, and can be used as a post-ride stretching station at rear of bike 10 after the rider 26 dismounts the seat 12.

It should be understood that the rider 26 can assume multiple riding positions, such as the riding positions shown in FIGS. 1A-1C, at various times during the course of a single exercise session or over multiple exercise sessions.

Figure 1D:
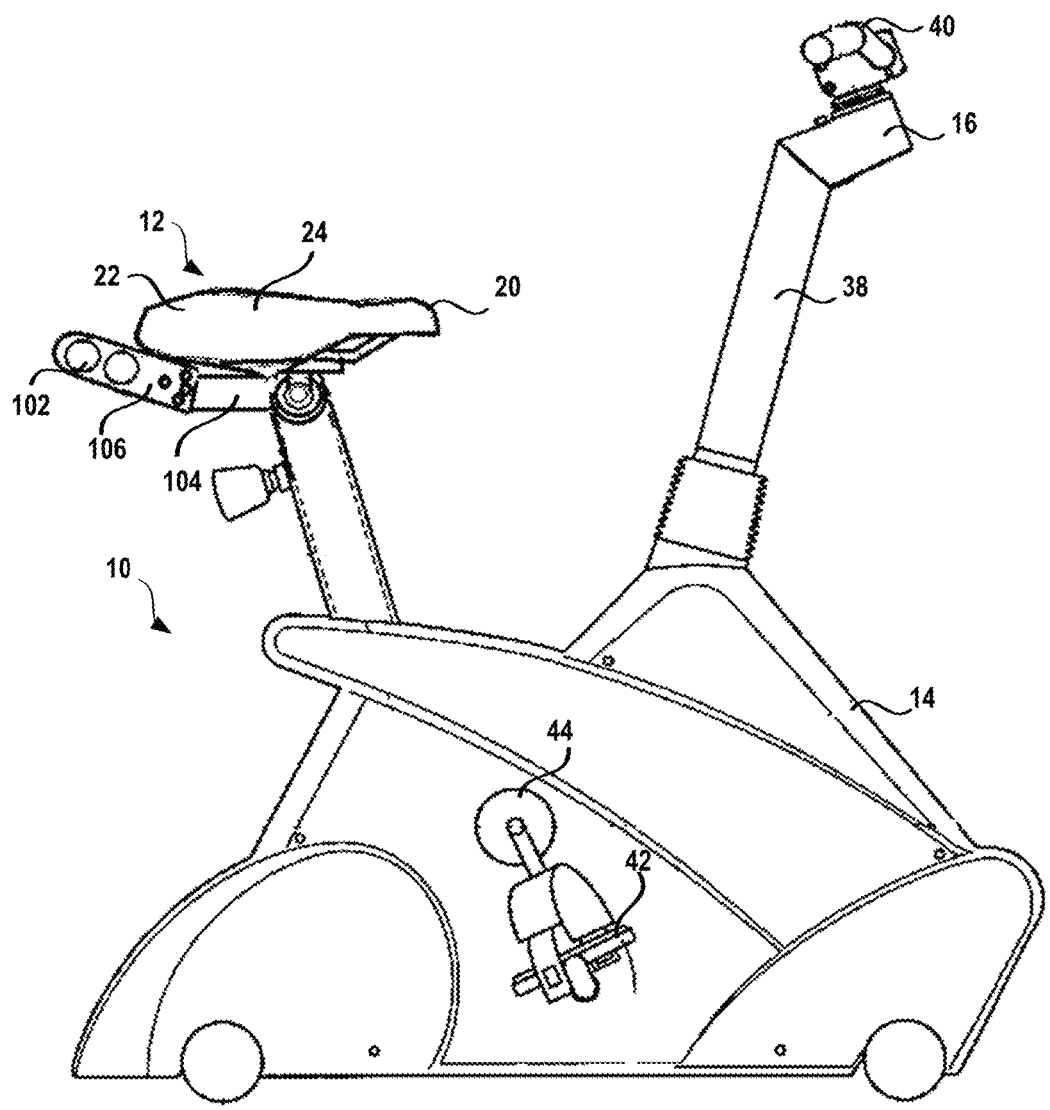
FIG. 1D illustrates a side elevation view of a stationary bike assembly that can implement aspects of the described subject matter.

Referring now to FIG. 1D with continuing reference to the foregoing figures, the seat 12 is positioned above the body 14 in a spaced-apart overlying relationship. The seat 12 is supported by a vertically aligned supporting member 36 that connects to the body 14. The supporting member 36 is a permanent seat post that is universally present on all standard stationary exercise bikes.

The front handlebar assembly 16 includes a mounting member 38 that supports a pair of front handlebars 40. The mounting member 38 projects upwardly from the body 14 at an angle. The body 14 include a pair of pedals 42 and an internal flywheel assembly 44 mounted therein.

The rider 26, shown in FIGS. 1A-1C, can sit on the seat upper surface 24 and face the front handlebars 40. The rider 26 extends his or her legs 46 on the pedals 42 to turn a flywheel (not shown) within the internal flywheel assembly 44 to ride the stationary bike 10. The position of the legs 46, relative to the torso 28, is a difference between the stationary bike 10 and a recumbent exercise bike in which the rider 26 would be limited to seated or leaning back position.

The rider 26 can ride the bike 10 in the outdoor riding position shown in FIG. 1A, the upright vertical position shown in FIG. 1B, and/or the upright vertical position shown in FIG. 1C. Riding the bike 10 in the upright vertical position shown in FIG. 1C, requires the use of the rear handlebar assembly 100. The rear handlebar assembly 100 can stabilize the rider 26 in the upright vertical position.

The rear handlebar assembly 100 includes a crossbar 102, a joining member 104 positioned between the seat 12 and the body 14, and an extending member 106 pivotally connected to the joining member 104. The crossbar 102 forms a rear handlebar particularly adapted for support the hands 34 of rider 26 in the upright riding position shown in FIG. 1C.

Figure 2A:
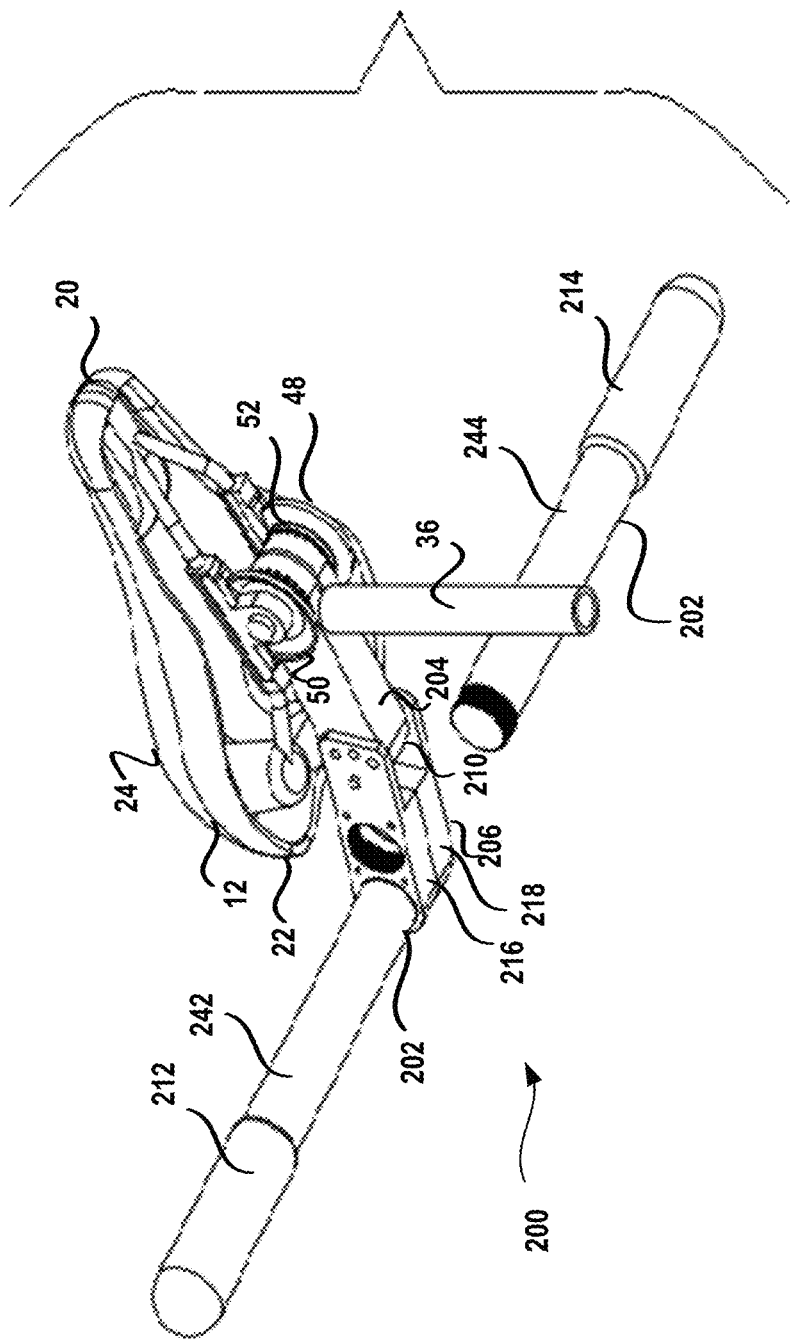
FIG. 2A illustrates an exploded perspective view of a preferred embodiment of a rear handlebar assembly that can implement aspects of the described subject matter.
Figure 2B:
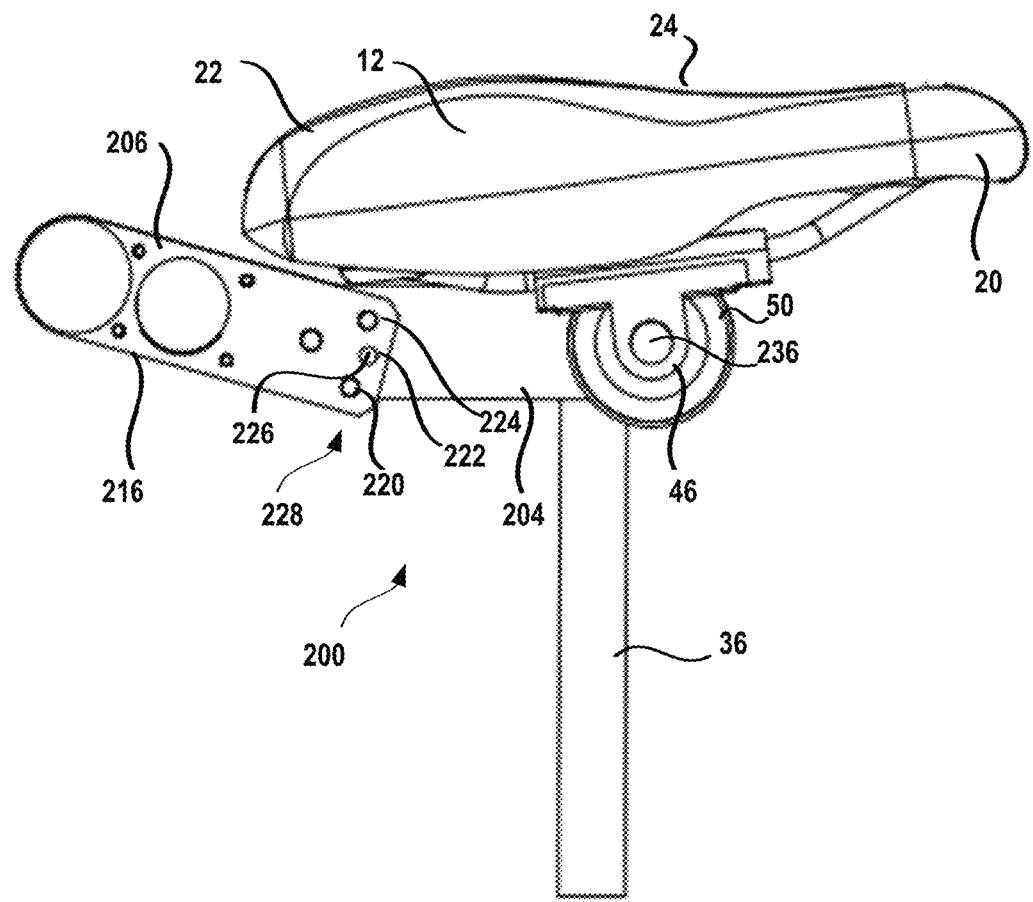
FIG. 2B illustrates a side elevation view of the preferred embodiment of the rear handlebar assembly shown in FIG. 2A that can implement aspects of the described subject matter.
Figure 2C:
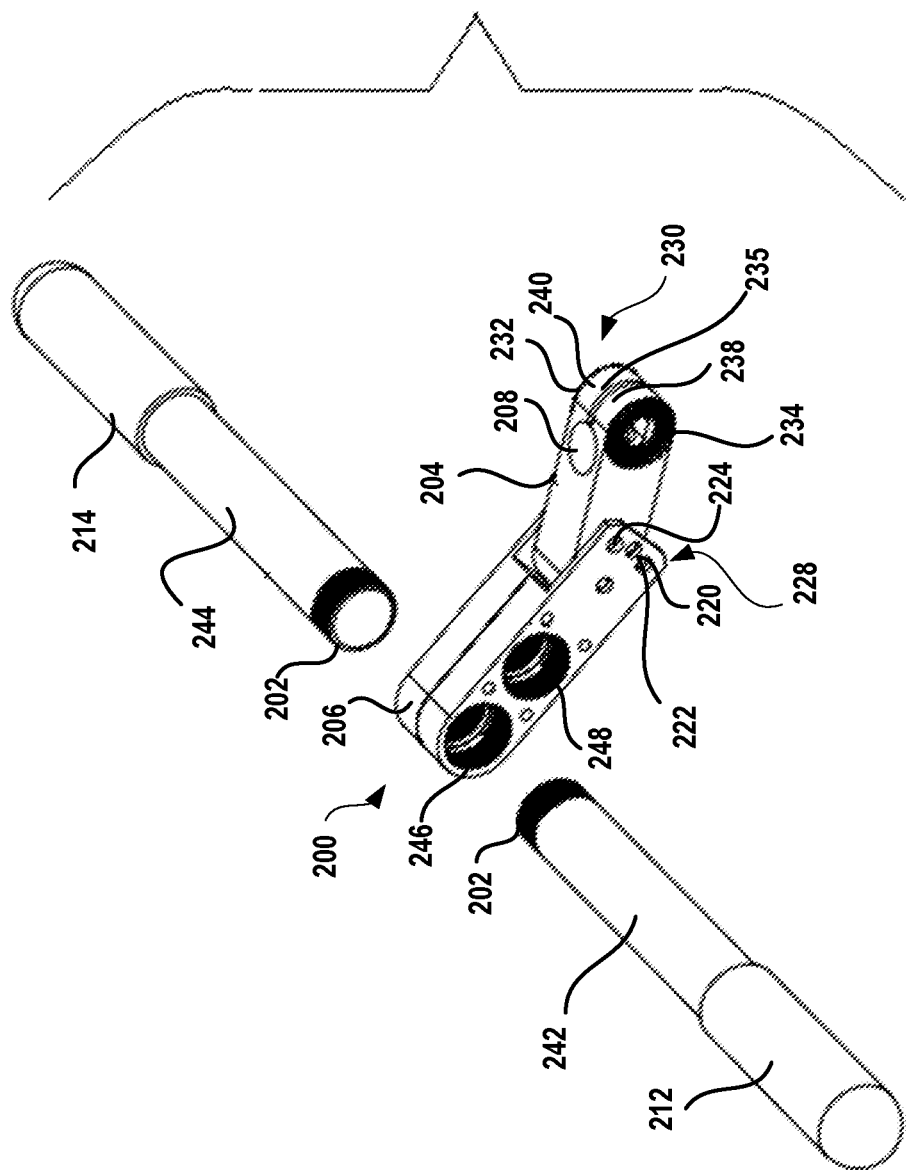
FIG. 2C illustrates another exploded perspective view of the preferred embodiment of the rear handlebar assembly shown in FIG. 2A that can implement aspects of the described subject matter.
Figure 3A:
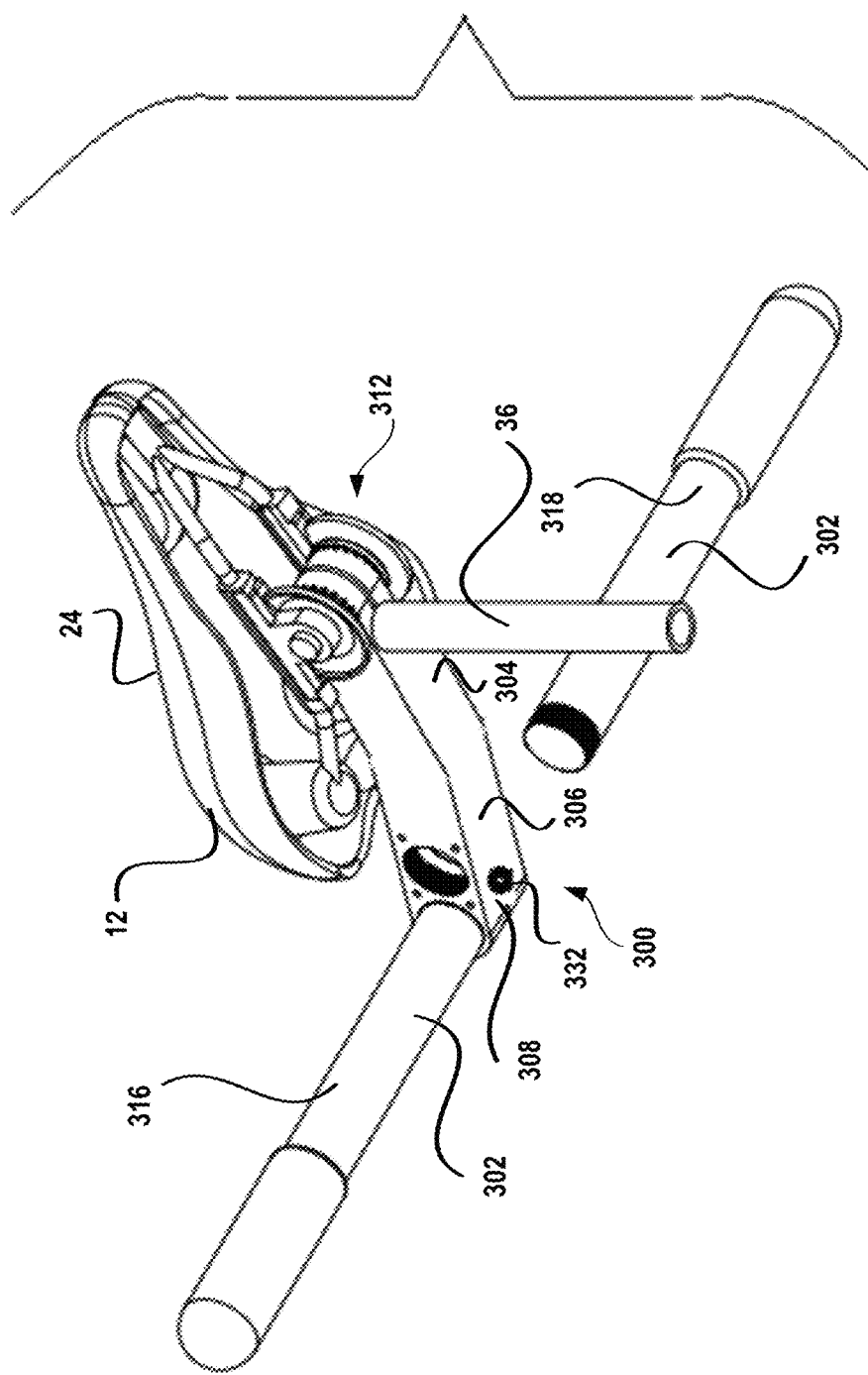
FIG. 3A illustrates an exploded perspective view of another preferred embodiment of a rear handlebar assembly that can implement aspects of the described subject matter.
Figure 3B:
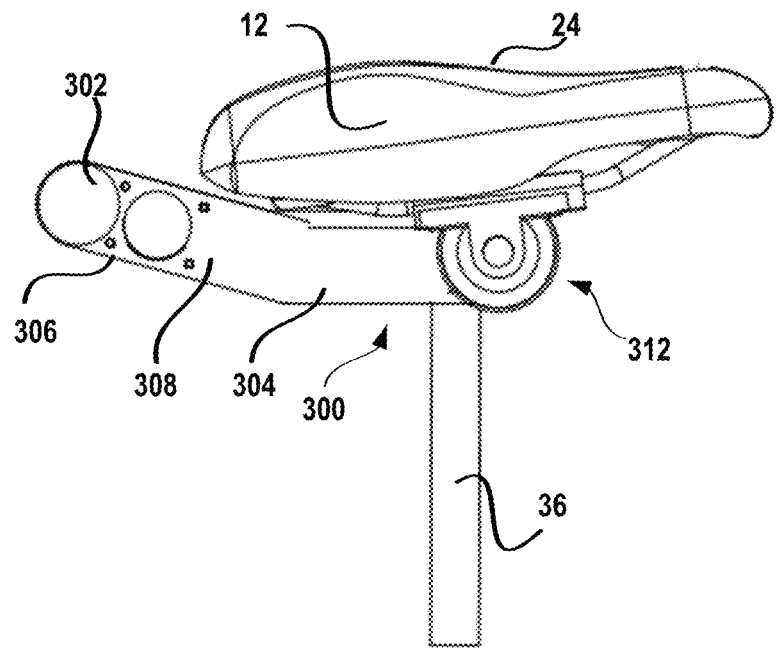
FIG. 3B illustrates a side elevation view of the preferred embodiment shown of the rear handlebar assembly in FIG. 3A that can implement aspects of the described subject matter.
Figure 3C:
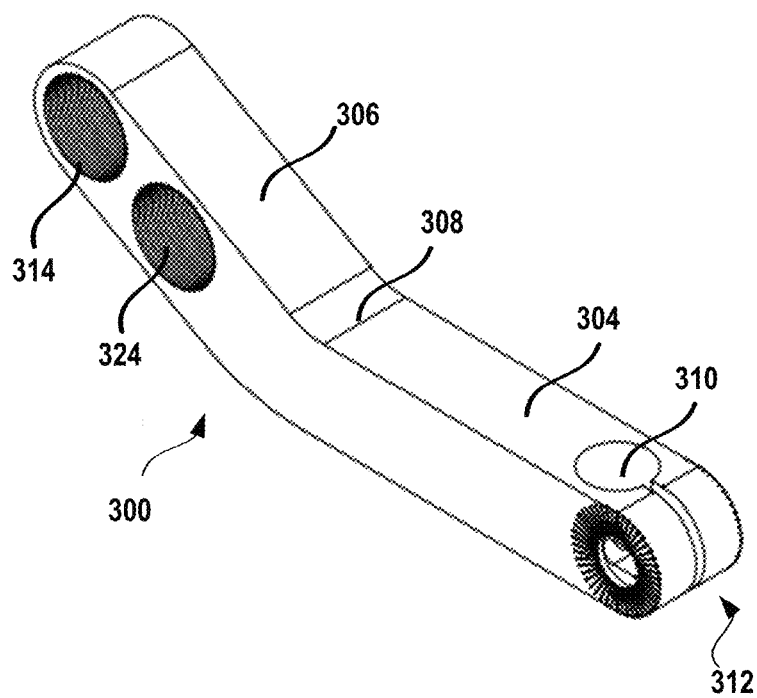
FIG. 3C illustrates a perspective view of the preferred embodiment of the rear handlebar assembly shown in FIG. 3A that can implement aspects of the described subject matter.

Now referring to FIGS. 2A-2C with continuing reference to the foregoing figures, a rear handlebar assembly 200 is illustrated as an embodiment of an exemplary component of a stationary bike that may implement aspects of the described subject matter. The handlebar assembly 200 is mounted below the seat 12 that is supported by supporting member 36 in the same manner as shown in FIGS. 1A-1D. The seat 12 includes front portion 20, rear portion 22, and upper surface 24. The seat 12 is aligned in a similar manner as shown in FIGS. 1A-1D, so that a rider (not shown) overlooks the front portion 20 in the same manner as shown in FIGS. 1A-1C.

The handlebar assembly 200 includes a crossbar 202, a joining member 204, and an extending member 206. The joining member 204 connects to the supporting member 36 to mount the handlebar assembly 200 below seat 12. The extending member 206 connects the joining member 204 to the crossbar 202. The extending member 206 supports the crossbar 202 and positions the crossbar 202 relative to the seat 12.

The joining member 204 includes a vertical bore 208 therethrough for receiving the supporting member 36 to connect the handlebar assembly 200 to the stationary bike 10 shown in FIG. 1D. The joining member 204 and the extending member 206 project rearwardly to position the crossbar 202 behind the seat 12. The joining member 204 and the extending member 206 have sufficient length to position the crossbar 202 behind the seat rear portion 22, at least partially, in this embodiment.

The extending member 206 is connected, pivotally, to the joining member 204 at one end 210. In the configuration shown in FIGS. 2A-2C, the extending member 206 projects upwardly from the joining member 204 at an angle that is about 30 degrees in relation to the joining member 204 when it is connected to the supporting member 36.

The crossbar 202 projects from the extending member 206 in a direction that is essentially perpendicular to joining member 204. The crossbar 202 forms a handlebar that provides support in the riding position shown in FIG. 1D. The crossbar 202 can include a pair of handgrips 212-214. The grips 212-214 can provide a counterbalance that allows a rider, such as rider 26 shown in FIGS. 1A-1C, to ride at higher workloads while in the upright riding position. The handgrips 212-214 can remain attached within the existing footprint space of the bike 10.

The crossbar 202 is positioned below the seat upper surface 24 in this embodiment, but the crossbar 202 can be positioned above the seat upper surface 24 in other embodiments.

The extending member 206 is formed from a pair of pivot plates 216-218. The extending member 206 has the ability to rotate relative to the joining member 204 from 0 degrees to about 30 degrees or, in some embodiments, greater than about 30 degrees. The extending member 206 includes a plurality of holes 220-224 that receives a pin 226 to form a locking mechanism 228. It should be understood that the inner surfaces of the holes 220-224 and/or the pin 226 can be threaded or smooth.

The locking mechanism 228 has the ability to fix the extending member 206 in a plurality of intermediate positions relative to the joining member 204. In this embodiment, the locking mechanism 228 can lock the joining member 204 in three positions relative to the extending member 206. The positions are 0 degrees, about 15 degrees, and about 30 degrees. It should be understood that the locking mechanism 228 can fix the extending member 206 in more than three positions or fewer than three positions in other embodiments.

The joining member 204 includes an attachment mechanism 230 positioned at a bifurcated end 232 that is opposite of the 210. The attachment mechanism 230 fixes the joining member 206 to the seat 12.

The attachment mechanism 230 is essentially a horizontal bore 234 and a shaft 236 that can be inserted therein. The horizontal bore 234 that extends through the joining member 204 transverse to the vertical bore 208. The horizontal bore 234 is essentially adjacent to the bifurcated end 232 and has a channel 235 that extends through the bifurcated end 232 to form two surfaces 238-240.

The seat 12 includes a pair of tubular flanges 46-48 that extend downwardly and a pair of conical spacers 50-52. The spacers 50-52 are tubular, so that the shaft 236 can be inserted through the flanges 46-48, the spacers 50-52, and the horizontal bore 234 to fix joining member 204 to the supporting member 36. The horizontal bore 234 can be serrated.

The crossbar 202 can be formed from a single piece or multiple pieces. In this embodiment, the crossbar 202 is formed from a pair of threaded inserts 242-244 that can screw into one of the horizontal bores 246-248 in the extending member 206. Threaded insert 242 includes integral hand grip 212. Threaded insert 244 includes integral hand grip 214.

The components of the handlebar assembly 200, including crossbar 202, joining member 204, and extending member 206, can be made from any suitable material through any suitable manufacturing method. Suitable materials include flexible, semi-flexible, rigid, or semi-rigid materials. Suitable materials also include metals, ceramics, plastics, and composites.

It should be understood that each component of the invention, individual components of the present invention can be made of a material that is specifically suited for the individual structural tolerances. Any combination of material or a uniform application of a single material that results in an acceptably robust structure is suitable. In this embodiment, the crossbar 202, joining member 204, and the extending member 206, are made from steel or aluminum.

Referring now to FIGS. 3A-3F with continuing reference to the foregoing figures, a rear handlebar assembly 300 is illustrated as an embodiment that may implement aspects of the described subject matter. Like the embodiments shown in FIGS. 1A-2C, the rear handlebar assembly 300 can be connected stationary bike 10 shown in FIGS. 1A-D.

The rear handlebar assembly 300 is supported by a vertically aligned supporting member 36 and positioned below a bike seat 12. The supporting member 36 can support the bike seat 12 in an overlying relationship with stationary bike body 14, as shown in FIGS. 1A-1D.

The rear handlebar assembly 3000 includes a crossbar 302, a joining member 304, and an extending member 306. Unlike the embodiments shown in FIGS. 1A-2C, the joining member 304 is integral with the extending member 306 to form a hockey-stick shaped extended bar 308.

The joining member 304 includes a bore 310 for receiving the supporting member, 36 and an attachment mechanism 312 for fixing the handlebar assembly 300 to the seat 12.

The extending member 306 includes a bore 314 for receiving the crossbar 302. Like the embodiments shown in FIGS. 1A-2C, the crossbar 302 can be formed from a pair of threaded inserts 316-318 and is positioned below a seat upper surface 24.

Unlike the embodiment shown in FIGS. 2A-2C, the joining member 304 is permanently connected to the extending member 306 in a fixed manner. The joining member 304 is formed from the same material as the extending member 306 to form the integral, one-piece extended bar 308.

Referring now to FIGS. 3D-3F with continuing reference to the foregoing figures, the extended bar 308 can be attached to an additional exercise device 320. The exercise device 320 can be formed from exercise bands that can be made from any suitable material, such as latex. The exercise device 320 can be used to perform various exercise movements specific to the shoulders, arms, back and chest in a seated, upright vertical position.

The exercise device 320 can be anchored to the rear handlebar assembly 300 using various attachment methods. For example, the exercise device 320 can be attached to the extending member 306, as shown in FIG. 3D. A hollow tube 322 is inserted into a second bore 324 in the extending member 306 to attach the exercise device 320 to the extended bar 308. The exercise device 320 is inserted into the hollow tube 322, so that both ends 326-328 can be used can be used to perform the exercise movements.

In an alternative embodiment, the exercise device 320 can be attached using an eyehook attachment 330, as shown in FIG. 3E. The eyehook attachment 330 is inserted into a threaded bore 332 in the extending member 306. The exercise device 320 is inserted into the eyehook attachment 330, so that both ends 326-328 can be used can be used to perform the exercise movements.

In another alternative embodiment, the exercise device 320 can be inserted into a second bore 324 in the extending member 306, directly, to attach the exercise device 320 to the extended bar 308, as shown in FIG. 3F. Then, both ends 326-328 both ends 326-328 can be used can be used to perform the exercise movements.

Referring now to FIGS. 4A-4E with continuing reference to the foregoing figures, a rear handlebar assembly 400 is illustrated as an embodiment that may implement aspects of the described subject matter. Like the embodiments shown in FIGS. 1A-3C, the rear handlebar assembly 400 can be positioned between the bike seat 12 and the bike body 14 shown in FIGS. 1A-1D. The bike seat 12 is in a spaced-apart, overlying relationship with the bike body 14. The rear handlebar assembly 400 can be easily detached and removed from the bike 10 to allow the rider 26 to ride in the positions shown in FIGS. 1A-1B.

As shown in FIGS. 4A-4E, the rear handlebar assembly 400 includes a crossbar 402, a joining member 404, and extending member 406, a clamping mechanism 408, a locking mechanism 410, and an attachment mechanism 412. The clamping mechanism 408 releasably attaches the crossbar 402 to the extending member 406. The locking mechanism 410 releasably attaches the extending member 406 to the joining member 404. The attachment mechanism 412 releasably attaches the rear handlebar assembly 400 to the seat 12.

The extending member 406 can include a slight, corrective slope that can be upwards or downwards in relation to the position of the seat 12 in some embodiments. The slope can make it easier for the rider 26 to grasp the crossbar 402 in the riding position shown in FIG. 1D. In other embodiments, the extending member 406 can include protrusions extruding from a bottom surface to the exercise bike body 10 shown in FIGS. 1A-1D to provide additional structural support.

Unlike the embodiments shown in FIGS. 1A-3C, the attachment mechanism 412 includes an upper plate 414, two narrow lower plates 416-418, and four threaded members 420-426. The upper plate 414 is positioned in an overlying relationship with the joining member 404. The lower plates 416-418 are positioned below the joining member 404.

The joining member 404, the upper plate 414, and the lower plates 416-418 have a plurality of bores that can be aligned with one another. The threaded members 420-426 can be inserted into the bores to attach the joining member 404, the upper plate 414, and the lower plates 416-418 to one another. The joining member 404 and the upper plate 414 can include complementary grooves that receive the side rails 54-56 that extend downwardly from the bike seat 12. The joining member 404, the upper plate 414, and the lower plates 416-418 can be pressed together to releasably attach the rear handlebar assembly 404 to the stationary bike 10.

Unlike the embodiments shown in FIGS. 1A-3C, the locking mechanism 410 includes a tightening handle 428, a threaded member 430, and a nut 432. The threaded member 430 includes a long, cylindrical body portion having threads running along the length, at least partially.

The handle 428 includes a plurality of protrusions 434-438 that extend radially and outwardly from the axis of rotation and are spaced apart at equal angles. The handle 428 can be gripped and rotated by a torsional force to rotate the threaded member 430 to extend through the extending member 406 and the joining member 404. The nut 432 contacts one end 440 of the threaded member 430 to attach, releasably, the extending member 406 to the joining member 404.

Figure 4A:
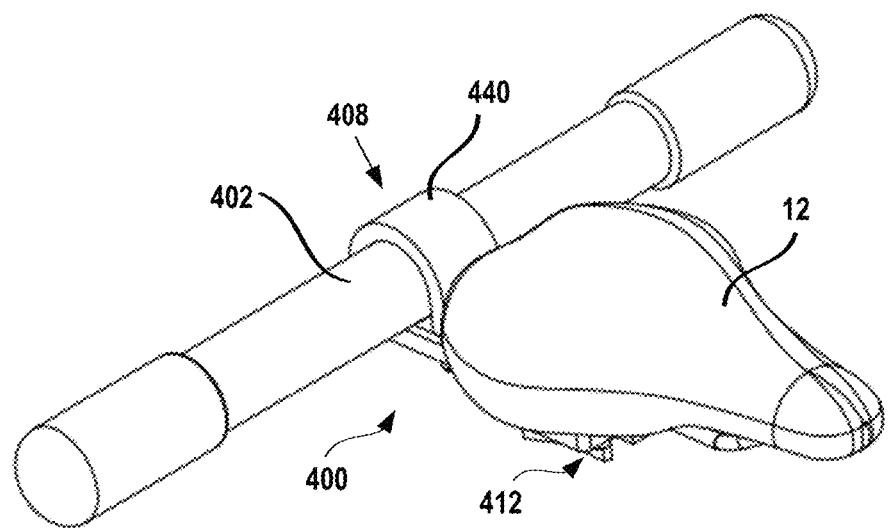
FIG. 4A illustrates an exploded perspective view of another preferred embodiment of a rear handlebar assembly that can implement aspects of the described subject matter.
Figure 4B:
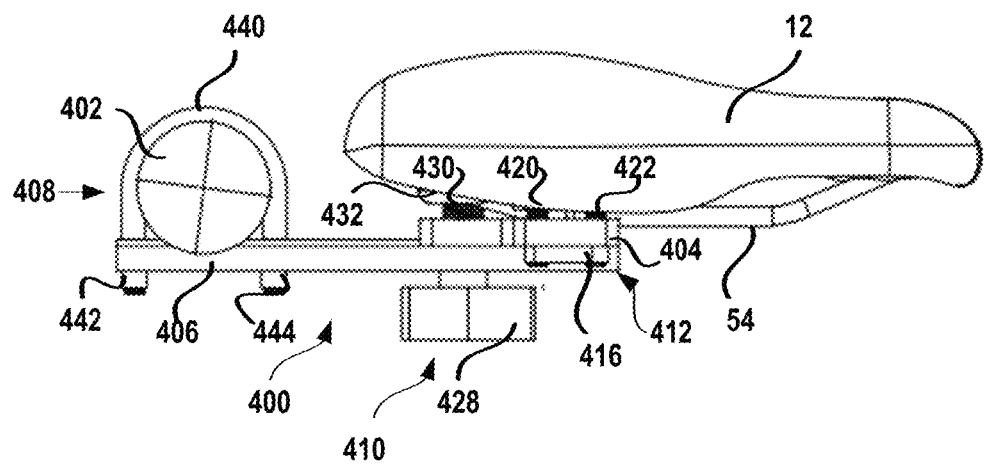
FIG. 4B illustrates a side elevation view of the preferred embodiment of the rear handlebar assembly shown in FIG. 4A that can implement aspects of the described subject matter.
Figure 4C:
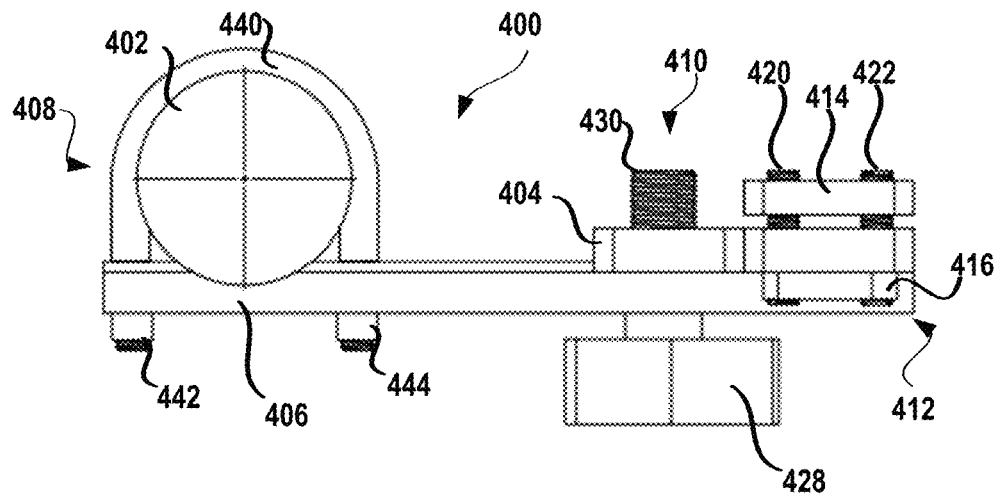
FIG. 4C illustrates another side elevation view of the preferred embodiment of the rear handlebar assembly shown in FIG. 4A that can implement aspects of the described subject matter.
Figure 4D:
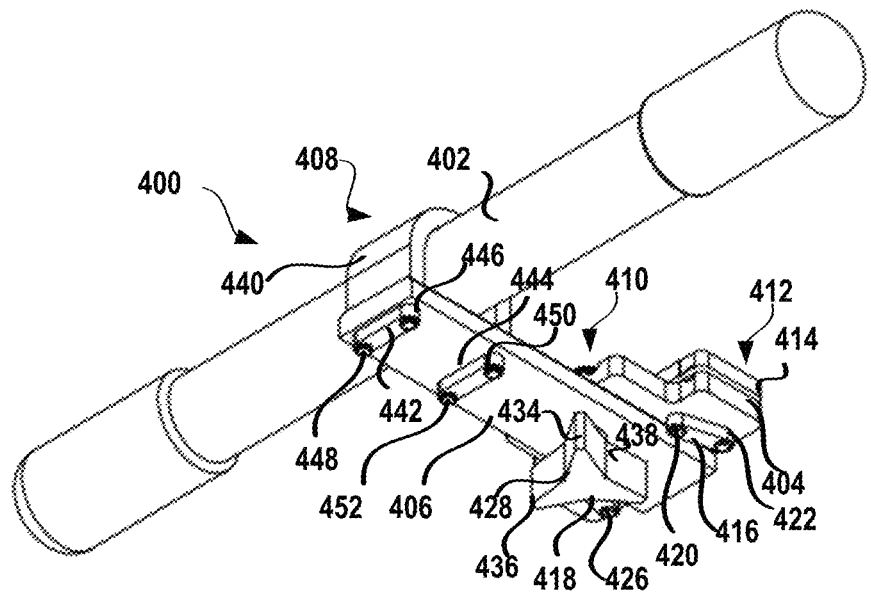
FIG. 4D illustrates another perspective view of the preferred embodiment of the rear handlebar assembly shown in FIG. 4A that can implement aspects of the described subject matter.
Figure 4E:
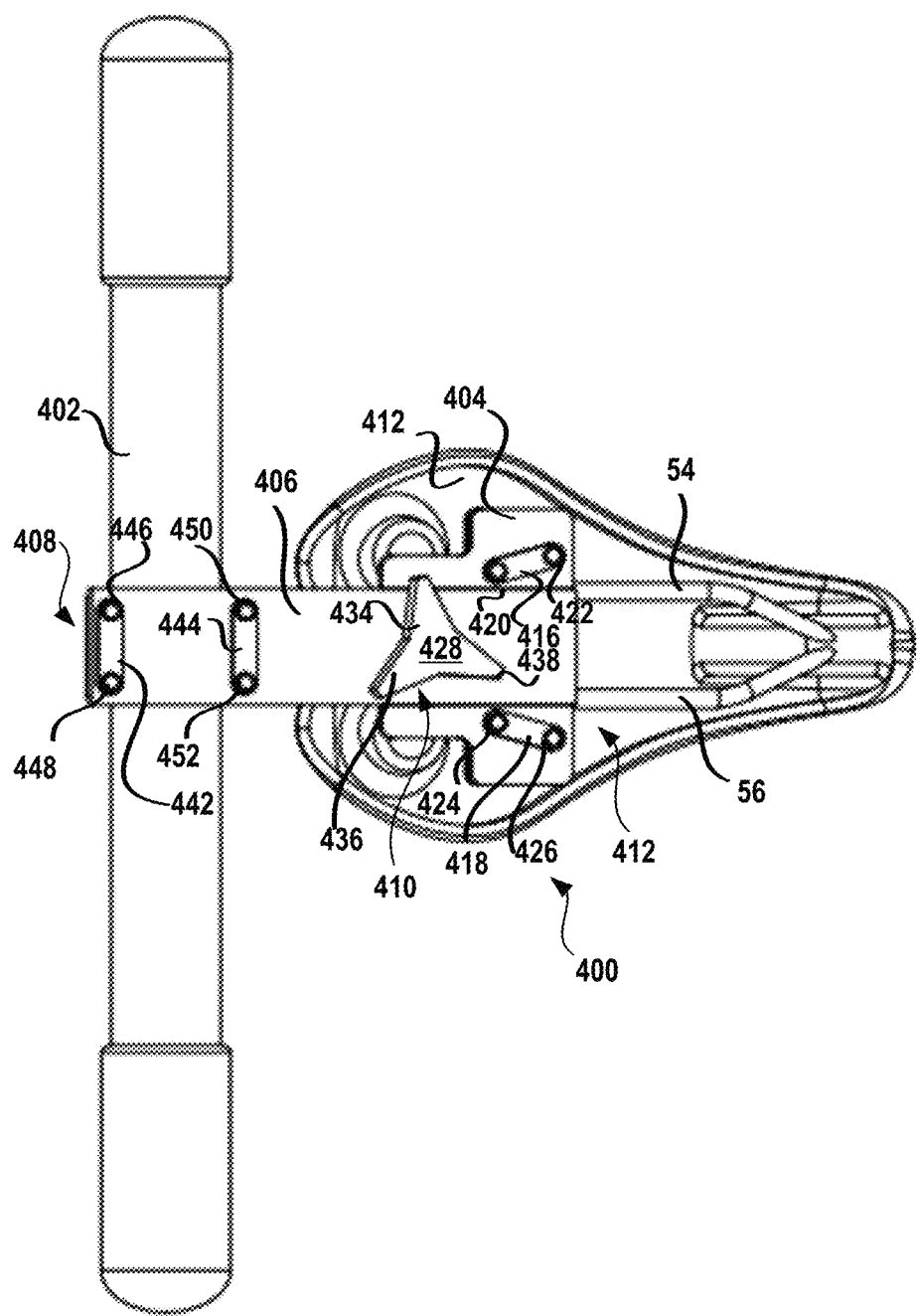
FIG. 4E illustrates another perspective view of the preferred embodiment of the rear handlebar assembly shown in FIG. 4A that can implement aspects of the described subject matter.

The shape of the handle 428 is not critical and can include more protrusions or fewer protrusions than are shown in FIG. 4D. The handle 428 can be circular with no protrusions in alternative embodiments.

The threaded member 430 has a radius of predetermined size to accommodate insertion into the extending member 406 and the joining member 404. The size of the threaded member 430 is not critical, but must be sufficient to support the extending member 406 against the joining member 404 in a rigid manner. The extending member 406 frictionally engages the joining member 404 to provide additional stability.

Unlike the embodiments shown in FIGS. 1A-3C, the clamping mechanism 408 includes an encircling arm 440 and a pair of lower plates 442-444. The encircling arm 440 includes two pairs of extensions 446-452 that extend through the extending member 406 to frictionally engage the lower plates 442-444. The encircling arm 440 includes a semicircular tube that encircles the crossbar 402 to attach, releasably, the crossbar 402 to the extending member 406.

The extending member 406 can have a plurality of bores arranged in pairs to fix the encircling arm 440 in a single position or in a plurality of positions. The bores can be slotted or of fixed dimension to attach the encircling arm 440 in a predetermined position or plurality of positions. The encircling arm 440 can be repositioned to move the crossbar 402 relative to the seat 14 in various alternative embodiments.

Figure 5:
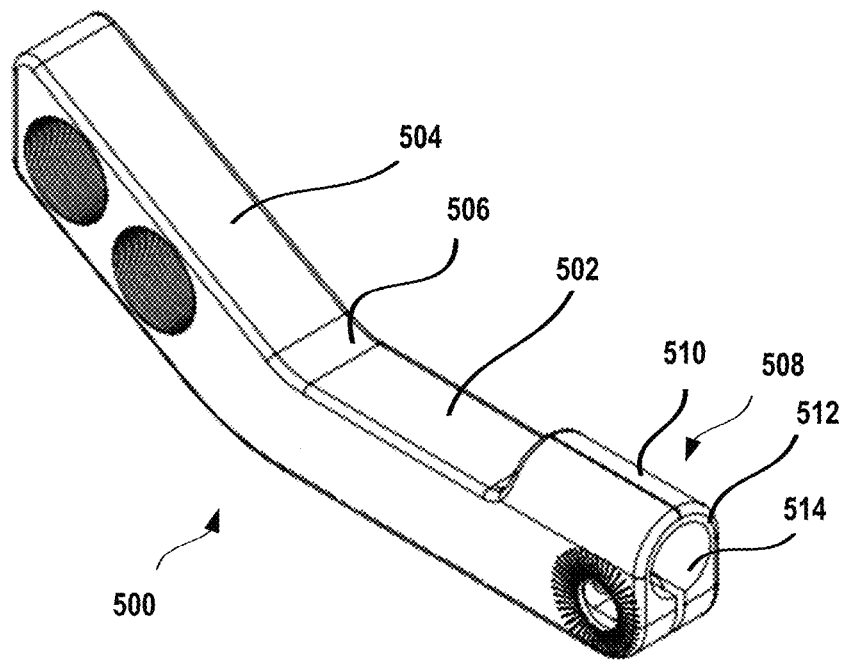
FIG. 5 illustrates a perspective view of another preferred embodiment of a rear handlebar assembly that can implement aspects of the described subject matter.

Referring now to FIG. 5 with continuing reference to the foregoing figures, a rear handlebar assembly 500 is illustrated as an embodiment that may implement aspects of the described subject matter. Unlike the embodiments shown in FIGS. 1A-4E, the rear handlebar assembly 500 is particularly adapted to connect to a stationary bike (not shown) that includes an essentially horizontal connecting member (not shown).

The rear handlebar assembly 500 includes a joining member 502 and an extending member 504. The joining member 502 is integral with the extending member 504 to form a hockey-stick shaped extended bar 506.

The joining member 502 includes an attachment mechanism 508 at one end. The attachment mechanism 508 includes essentially cylindrical raised portion that forms a tubular housing 510. The tubular housing 510 includes an opening 512 that communicates with an inner chamber 514. The inner chamber 514 can receive the horizontal connecting member (not shown).

Referring now to FIGS. 6A-6D with continuing reference to the foregoing figures, a crossbar 600 is illustrated as an embodiment that may implement aspects of the described subject matter. The crossbar 600 is particularly adapted for use in the embodiment of the rear handlebar assembly 400 shown in FIGS. 4A-4E, but aspects can be adapted for use in the embodiments of the rear handlebar assemblies 100, 200, and 300, shown in FIGS. 1A-3C.

As shown in FIGS. 6A-6D, the crossbar 600 includes a tubular housing 602, a right insert 604, and a left insert 606. The tubular housing 602 includes a hollow cylindrical tube with openings 608-610 on each end. Right insert 604 fits into opening 608. Left insert 606 fits into opening 610.

The right insert 604 includes a grip 612 on one end and a flange 614 at a predetermined distance from the other end. The flange 614 encircles a portion of the outer surface of the right insert 604. The left insert 606 includes a grip 616 on one end and a flange 618 at a predetermined distance from the other end. The flange 618 encircles a portion of the outer surface of the left insert 606. The flanges 614, 618 act as physical abutments that frictionally engage the outer edges of the openings 608, 610 of the housing 602 to prevent the inserts 604-606 from being inserted beyond a predetermined depth within the tubular housing 602.

The grips 612 and 616 can be symmetrically shaped or asymmetrically shaped. The grips 612 and 616 can have an essentially straight outer surface, the grips 612 and 616 can be curved to provide a more ergonomic design.

Figure 6F:
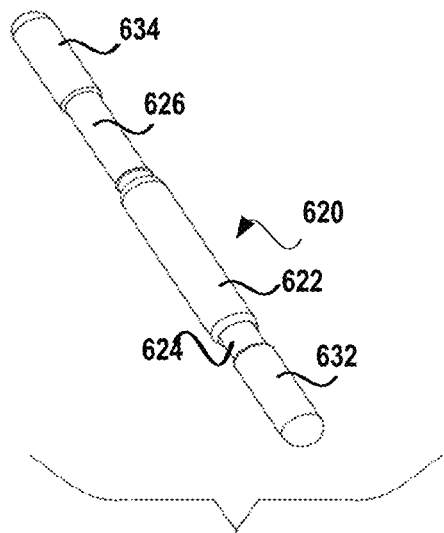
FIG. 6F is a perspective view of the crossbar shown in FIG. 6E that can implement aspects of the described subject matter.

Referring now to FIGS. 6E-6F with continuing reference to the foregoing figures, a crossbar 620 is illustrated as an embodiment that may implement aspects of the described subject matter. The crossbar 620 is particularly adapted for use in the embodiment of the rear handlebar assembly 400 shown in FIGS. 4A-4E, but aspects can be adapted for use in the embodiments of the rear handlebar assemblies 100, 200, and 300, shown in FIGS. 1A-3C.

As shown in FIGS. 6E-6F, the crossbar 620 includes a tubular housing 622, a right insert 624, and a left insert 626. The tubular housing 622 includes a hollow cylindrical tube with openings 628-630 on each end. The right insert 624 includes a grip 632. The left insert 626 includes a grip 634.

Right insert 624 can be inserted into opening 628. Left insert 626 can be inserted into opening 630. Tubular housing 622 includes a pair of stoppers 636-638 within an inner chamber 640 that prevents the inserts 624-626 from being inserted beyond a predetermined depth within the tubular housing 622.

Figure 6G:
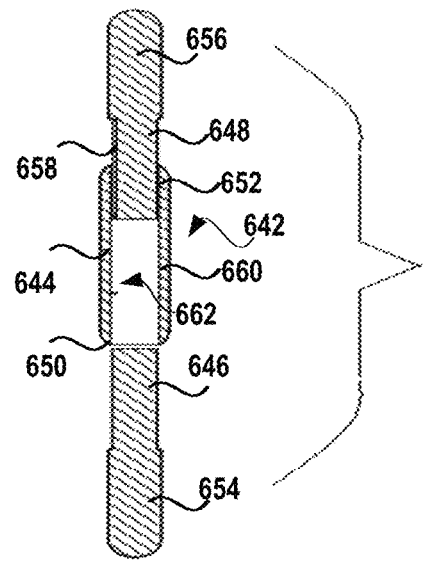
FIG. 6G is a sectional view in side elevation of another embodiment of a crossbar that can implement aspects of the described subject matter.
Figure 6H:
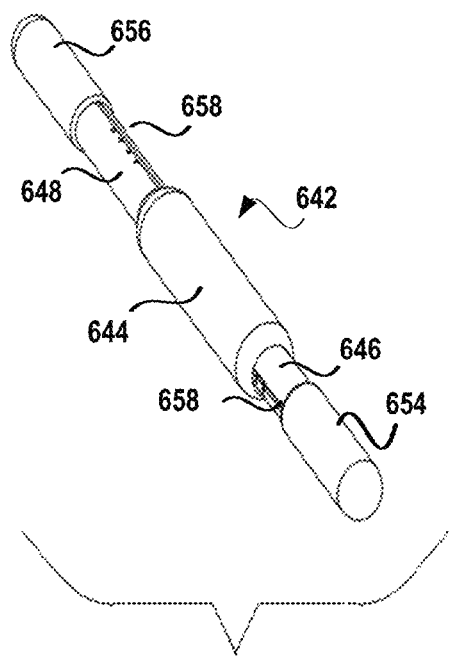
FIG. 6H is a fragmentary sectional view in side elevation of the crossbar shown in FIG. 6G that can implement aspects of the described subject matter.

Referring now to FIGS. 6G-6H with continuing reference to the foregoing figures, a collapsible crossbar 642 is illustrated as an embodiment that may implement aspects of the described subject matter. The crossbar 642 is particularly adapted for use in the embodiment of the rear handlebar assembly 400 shown in FIGS. 4A-4E, but aspects can be adapted for use in the embodiments of the rear handlebar assemblies 100, 200, and 300, shown in FIGS. 1A-3C.

As shown in FIGS. 6G-6H, the crossbar 642 includes a tubular housing 644, a right insert 646, and a left insert 648. The tubular housing 644 includes a hollow cylindrical tube with openings 650-652 on each end. The right insert 646 includes a grip 654. The left insert 648 includes a grip 656.

Unlike the embodiments shown in FIGS. 6A-6F, the inserts 646-648 include extended slots 658-660 that form a plurality of channels. The tubular housing 644 includes an inner chamber 660 that includes at least one square protruding locking tab 662 that engages the channels within the slots 658 to allow the inserts 646-648 to be inserted into the openings 650-652 at preselected depths.

Exemplary Processes

Figure 7:
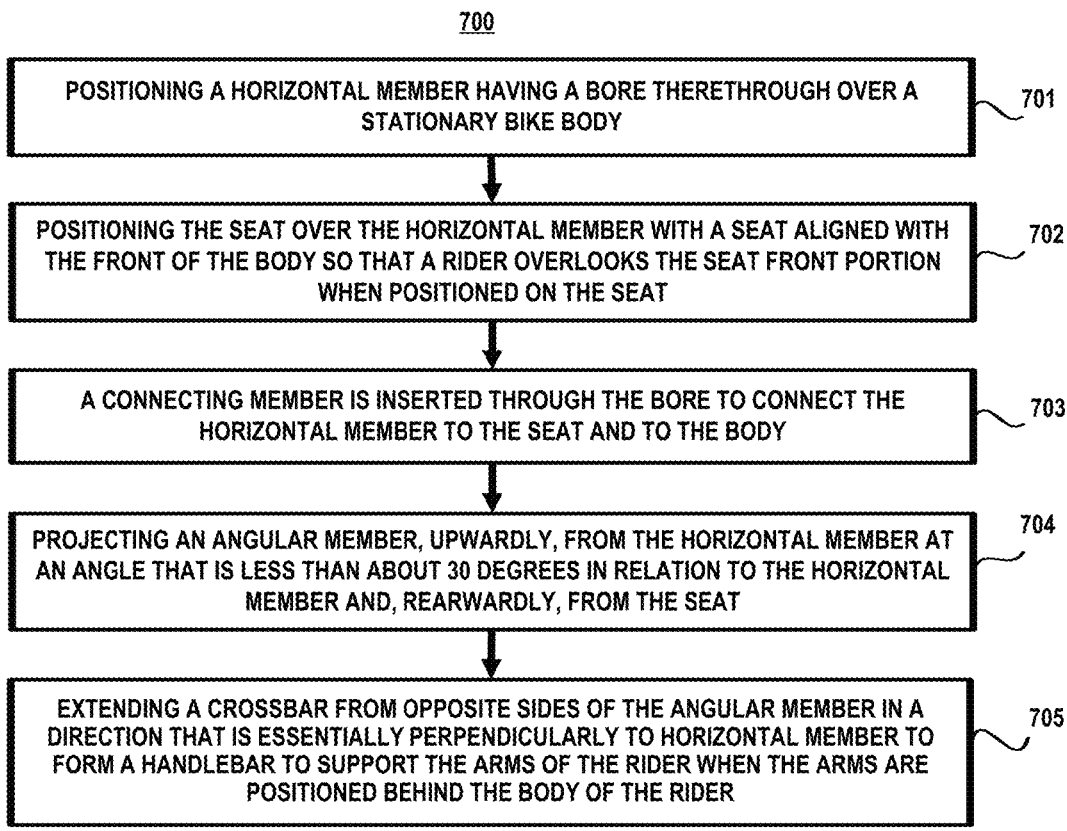
FIG. 7 illustrates an embodiment of an exemplary process in accordance with aspects of the described subject matter.

Referring to FIG. 7 with continuing reference to the foregoing figures, a method 700 for assembling the exemplary rear handlebar assembly in accordance with aspects of the described subject matter is shown. Method 700, or portions thereof, can be performed to assemble the exemplary rear handlebar thereof in various embodiments. For example, method 700 can be performed to assemble rear handlebar assemblies 100, 200, 300, 400 and 500 shown in FIGS. 1A-5. The handlebar assembly can include and utilize the crossbars 600, 620 and/or 642 shown in FIGS. 6A-6H.

At 701, a joining member having a bore therethrough is positioned over a stationary bike body. In this exemplary embodiment, a joining member that can be joining members 104, 204, 304, 404 or 502 shown in FIGS. 1A-5 can be positioned over a stationary bike body that is essentially identical to stationary bike body 14 shown FIGS. 1A-1D.

At 702, a seat is positioned over the joining member with the seat aligned with the front of the body so that a rider overlooks the seat front portion when positioned on the seat. In this exemplary embodiment, the seat is essentially identical to the seat 12, shown in FIGS. 1A-4E, and the body is essentially identical to the body 14, shown in FIGS. 1A-4E. The alignment of the seat 12 relative to the body 14 allows a rider to assume the riding positions in the same manner as the rider 26 shown in FIGS. 1A-1C.

At 703, a supporting member is inserted through the bore to connect the joining member to the seat and to the body. In this exemplary embodiment, the supporting member is essentially identical to the supporting member 36, shown in FIGS. 1A-4E.

At 704, an extending member is projected, upwardly, from the joining member at an angle that is less than about 30 degrees in relation to the joining member and, rearwardly, from the seat. In this exemplary embodiment, the extending member can be extending members 106, 206, 306, 406 and 504 shown in FIGS. 1A-5.

At 705, a crossbar is extended from opposite sides of the extending member in a direction that is essentially perpendicularly to joining member to form a handlebar to support the arms of the rider when the arms are positioned behind the body of the rider. In this exemplary embodiment, the crossbar can be any one of the crossbars 102, 202, 302, 402, 600, 620 or 642 shown in FIGS. 1A-6H.

Supported Aspects

The detailed description provided above in connection with the appended drawings explicitly describes and supports various aspects of a rear handlebar assembly for a stationary bike in accordance with the described subject matter. By way of illustration and not limitation, supported aspects include a handlebar assembly for a stationary bike having a body, a supporting member, and a seat with an upper surface, a front portion, and rear portion, the handlebar assembly comprising: a joining member positioned between the seat and the body with the seat aligned with the front of the body so that a rider overlooks the seat front portion when positioned on the seat; an extending member projecting upwardly from the joining member at an angle that is less than about 30 degrees in relation to the joining member and rearwardly with at least a portion of the extending member being positioned behind the seat rear portion; and a crossbar projecting from the extending member essentially perpendicularly to joining member to form a handlebar for providing support for the arms of the rider when the arms are positioned behind the body of the rider, wherein the seat is connected to the body upper surface with an essentially vertical supporting member so that the supporting member supports the seat in a spaced-apart overhead relationship with the body; wherein the joining member includes a bore therethrough for receiving the supporting member to connect the handlebar assembly to the stationary bike.

Supported aspects include the foregoing handlebar assembly, wherein the height of the crossbar does not exceed the height of the seat upper surface.

Supported aspects include any of the foregoing handlebar assemblies, which include means for connecting the joining member to the extending member.

Supported aspects include any of the foregoing handlebar assemblies, wherein the extending member is pivotally connected to the joining member.

Supported aspects include any of the foregoing handlebar assemblies, wherein: the extending member has the ability to rotate relative to the joining member an angle that is less than about 30 degrees in relation to the joining member to an angle that is 0 degrees in relation to the joining member, and the extending member includes a locking mechanism to fix the extending member in at least one intermediate position between an angle of about 30 degrees in relation to the joining member and an angle that is 0 degrees in relation to the joining member.

Supported aspects include any of the foregoing handlebar assemblies, wherein the joining member includes a mechanism to fix the joining member in place after the supporting member has been inserted into the joining member bore.

Supported aspects include any of the foregoing handlebar assemblies, wherein the crossbar includes a pair of hand grips.

Supported aspects include an apparatus, a system, a method and/or means for implementing any of the foregoing handlebar assemblies or portions thereof.

Supported aspects include a stationary bike having a body, a seat with a front portion and a rear portion, a supporting member to connect the seat to the body in a spaced-apart overhead relationship, and a rear handlebar assembly, the rear handlebar assembly comprising: a joining member positioned between the seat and the body; means for attaching the joining member to the supporting member; an extending member projecting upwardly from the joining member at an angle that is less than about 30 degrees in relation to the joining member, and a crossbar projecting from the extending member essentially perpendicularly to joining member; wherein at least one of the joining member and the extending member are positioned below the seat rear portion and the joining member and the extending member have sufficient length to position the crossbar behind the seat rear portion.

Supported aspects include the foregoing rear handlebar assembly, wherein the height of the crossbar does not exceed the height of an upper surface of the seat.

Supported aspects include any of the foregoing rear handlebar assemblies, wherein the joining member and the extending member are integral.

Supported aspects include any of the foregoing rear handlebar assemblies, wherein the extending member is pivotally connected to the joining member.

Supported aspects include any of the foregoing rear handlebar assemblies, which include means for pivotally connecting the extending member to the joining member.

Supported aspects include any of the foregoing rear handlebar assemblies, further comprising: means for connecting the extending member to the crossbar.

Supported aspects include any of the foregoing rear handlebar assemblies, wherein the crossbar includes a pair of hand grips.

Supported aspects include an apparatus, a system, a method and/or means for implementing any of the foregoing rear handlebar assemblies or portions thereof.

Supported aspects include a method for connecting a handlebar assembly to a stationary bike having a body, a supporting member, and a seat with an upper surface, a front portion, and rear portion, the method comprising: positioning a joining member having a bore therethrough over the body; positioning the seat over the joining member with the seat aligned with the front of the body so that a rider overlooks the seat front portion when positioned on the seat; inserting the supporting member through the bore to connect the joining member to the seat and to the body; projecting an extending member, upwardly, from the joining member at an angle that is less than about 30 degrees in relation to the joining member and, rearwardly, from the seat; and extending a crossbar from opposite sides of the extending member in a direction that is essentially perpendicularly to joining member to form a handlebar to support the arms of the rider when the arms are positioned behind the body of the rider.

Supported aspects include the foregoing method, further comprising: positioning the crossbar below the height of the seat upper surface.

Supported aspects include any of the foregoing methods, further comprising: pivotally connecting the extending member to the joining member.

Supported aspects include any of the foregoing methods, further comprising: rotating the extending member relative to the joining member; and locking the extending member in a position that is less than about 30 degrees in relation to the joining member.

Supported aspects include any of the foregoing methods, further comprising: fixing the joining member in place after the supporting member has been inserted into the joining member bore.

Supported aspects include any of the foregoing methods, further comprising: attaching a pair of hand grips to the crossbar.

Supported aspects include an apparatus, a system, and/or means for implementing any of the foregoing methods or portions thereof.

Supported aspects can provide various attendant and/or technical advantages in terms of improved efficiency and/or savings with respect to allowing stationary bike riders to maintain an upright posture for longer periods due to the inherent ergonomic (hand grip and counter balance) benefits associated with hand placement and position associated with a rear mounted handle bar.

By way of illustration and not limitation, various features and implementations in accordance with the described subject matter allow riders to grip a rear handlebar assembly from a natural arm position while seated on an indoor exercise bike seat, provide comfort by allowing longer and more frequent exercise sessions in an upright position to reduce neck strain and/or back strain.

Support aspects include a rear handlebar assembly that provides a counter balance grip that allows a rider to continue to ride at higher workloads in an upright riding position.

Supported aspects include a rear handlebar assembly that only needs to be installed one time, has no effect on bike seat adjustments, attaches to existing stationary indoor exercise bike within the existing "footprint" space of the bike, can be removed in between rides easily, and provides a sturdy post-ride stretching station at rear of bike after dismounting.

Supported aspects include additional exercise devices that can provide the rider with the ability to perform additional upper body exercises. These exercise devices can be anchored to the rear handlebar assembly to provide the rider with the ability to perform various exercise movements specific to the shoulders, arms, back and chest while seated on the bike in an upright exercise position. The exercise devices can be made from latex exercise bands or exercise bands that are made from other suitable materials.

The detailed description provided above in connection with the appended drawings is intended as a description of examples and is not intended to represent the only forms in which the present examples can be constructed or utilized.

It is to be understood that the configurations and/or approaches described herein are exemplary in nature, and that the described embodiments, implementations and/or examples are not to be considered in a limiting sense, because numerous variations are possible. The specific processes or methods described herein can represent one or more of any number of processing strategies. As such, various operations illustrated and/or described can be performed in the sequence illustrated and/or described, in other sequences, in parallel, or omitted. Likewise, the order of the above-described processes can be changed.

Although the subject matter has been described in language specific to structural features and/or methodological acts, it is to be understood that the subject matter defined in the appended claims is not necessarily limited to the specific features or acts described above. Rather, the specific features and acts described above are presented as example forms of implementing the claims.

What is claimed is:

1. A rear handlebar assembly in combination with a seat and a supporting member of a stationary bike, comprising:
   a seat of a stationary bike for supporting a rider thereon;
   a supporting member for supporting the seat of the stationary bike;
   a joining member including a vertical bore and a horizontal bore, the vertical bore receiving therein the supporting member, the horizontal bore receiving therein a shaft coupled to flanges of the seat;
   a crossbar forming a rear handlebar adapted to support the hands of a rider in an upright riding position; and
   a rearwardly extending member connecting the joining member to the crossbar.

2. The rear handlebar assembly of claim 1, wherein the vertical bore is positioned between the horizontal bore and the rearwardly extending member.

3. The rear handlebar assembly of claim 1, wherein the crossbar includes first and second threaded inserts.

4. The rear handlebar assembly of claim 3, wherein the first threaded insert screws into a first side of the rearwardly extending member and the second threaded insert screws into a second side of the rearwardly extending member, the second side opposing the first side.

5. The rear handlebar assembly of claim 4, wherein the rearwardly extending member includes a first bore at the first side of the rearwardly extending member for receiving the first threaded insert at a first position and a second bore at the first side of the rearwardly extending member for receiving the first threaded insert at a second position.

6. The rear handlebar assembly of claim 1, wherein the joining member and the rearwardly extending member are a single piece.

\* \* \* \* \*